(12) United States Patent
Fan

(10) Patent No.: US 9,817,178 B2
(45) Date of Patent: Nov. 14, 2017

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 217 days.

(21) Appl. No.: 14/762,854

(22) PCT Filed: Apr. 22, 2015

(86) PCT No.: PCT/CN2015/077147
§ 371 (c)(1),
(2) Date: Jul. 23, 2015

(87) PCT Pub. No.: WO2016/155050
PCT Pub. Date: Oct. 6, 2016

(65) Prior Publication Data
US 2017/0045674 A1  Feb. 16, 2017

(30) Foreign Application Priority Data

Apr. 2, 2015 (CN) .......................... 2015 1 0154773

(51) Int. Cl.
F21V 8/00 (2006.01)
(52) U.S. Cl.
CPC ........... *G02B 6/0068* (2013.01); *G02B 6/009* (2013.01); *G02B 6/0021* (2013.01); *G02B 6/0025* (2013.01)

(58) Field of Classification Search
CPC ..... G02B 6/0068; G02B 6/009; G02B 6/0025
See application file for complete search history.

(56) References Cited

U.S. PATENT DOCUMENTS

| | | | | |
|---|---|---|---|---|
| 8,441,608 B2* | 5/2013 | Heo | ................ | G02F 1/133615 349/161 |
| 8,562,200 B2* | 10/2013 | Park | .................... | G02B 6/0091 349/58 |
| 2010/0053939 A1* | 3/2010 | Fan | ..................... | G02B 6/0025 362/97.3 |
| 2010/0067218 A1* | 3/2010 | Lee | ................... | G02F 1/133605 362/97.1 |

(Continued)

*Primary Examiner* — Elmito Breval
(74) *Attorney, Agent, or Firm* — Andrew C. Cheng

(57) ABSTRACT

The present invention provides a backlight module, having a glue frame, a light guide plate, a first light source assembly and a second light source assembly, and the light guide plate, the first, the second light source assemblies are accommodated in the glue frame, and the first light source assembly has a light source, and the second light source assembly has a substrate, a plurality of laser light sources and a diffuser, and the laser light sources are aligned on the substrate, and the light guide plate has a first, a second incident surfaces, and the light source of the first light source assembly and the first incident surface are oppositely positioned, and the laser light sources and the second incident surface are oppositely positioned, and the diffuser is positioned between the laser light sources and the second incident surface with certain distances.

14 Claims, 2 Drawing Sheets

(56) References Cited

U.S. PATENT DOCUMENTS

| | | | | |
|---|---|---|---|---|
| 2010/0188607 A1* | 7/2010 | Park | .................... | G02B 6/0073 |
| | | | | 349/62 |
| 2011/0273631 A1* | 11/2011 | Hayashi | ............... | G02B 6/0091 |
| | | | | 348/790 |
| 2012/0120678 A1* | 5/2012 | Su | ....................... | G02B 6/0025 |
| | | | | 362/607 |
| 2013/0265503 A1* | 10/2013 | Hosoki | ............... | G02B 6/0068 |
| | | | | 348/790 |
| 2013/0342785 A1* | 12/2013 | Tsai | ................. | G02F 1/133308 |
| | | | | 349/58 |

* cited by examiner

BACKLIGHT MODULE AND DISPLAY DEVICE

CROSS REFERENCE

This application claims the priority of Chinese Patent Application No. 201510154773.X, entitled "Backlight module and display device", filed on Apr. 2, 2015, the disclosure of which is incorporated herein by reference in its entirety.

FIELD OF THE INVENTION

The present invention relates to a liquid crystal display technology field, and more particularly to a backlight module and display device.

BACKGROUND OF THE INVENTION

At present, a liquid crystal display device as being the display component of the electronic device has been widely applied in various kinds of electronic products. With the lightening development of the electronic products, the thickness of the liquid crystal display device becomes smaller and smaller, too. The backlight module is an important component in the liquid crystal display device. The thickness of the backlight module determines the thickness of the liquid crystal display device.

In present technology, all the backlight modules comprise a glue frame. The light guide plate is surrounded by the glue frame. The light source assembly is fixed at the light incident side of the light guide plate. With the growing dimension of the liquid crystal display device, the backlight module utilizes the laser light source to cooperate with the LED for achieving the full color if the display device. Because the lighting angle of the laser light source is small, and the laser light source and the LED require using respective light guide plates. The thickness of the backlight module has to be increased.

SUMMARY OF THE INVENTION

The technical issue that the embodiment of the present invention solves is to provide a backlight module, which raises the light coupling efficiency and decreases the thickness of the backlight module.

The present invention further provides a display device.

The present invention provides a backlight module, comprising a glue frame, a light guide plate, a first light source assembly and a second light source assembly, and the light guide plate, the first light source assembly and the second light source assembly are accommodated in the glue frame, and the first light source assembly comprises a light source, and the second light source assembly comprises a substrate, a plurality of laser light sources and a diffuser, and the plurality of laser light sources are aligned on the substrate, and the light guide plate comprises a first incident surface and a second incident surface adjacent to the first incident surface, and the light source of the first light source assembly and the first incident surface are oppositely positioned, and the plurality of laser light sources and the second incident surface are oppositely positioned, and the diffuser is positioned between the plurality of laser light sources and the second incident surface, and gaps are arranged between the diffuser and the second incident surface and between the diffuser and the laser light sources.

The first light source assembly comprises a first substrate, and the light source of the first light source assembly is a plurality of LED light sources aligned on the first substrate.

The light source of the first light source assembly and the plurality of laser light sources are not in the same horizontal plane.

The light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate, and the mesh dots corresponding to the laser light sources are aligned with a gradually increased density from an end close to the laser light sources as a start toward an end away from the laser light sources.

The light guide plate is a rectangular plate body, further comprising two adjacent non incident surfaces, and heat expansion directions of the light guide plate are directions of the non incident surfaces.

A length size of the first incident surface and a length size of the second incident surface of the light guide plate are unequal.

Both sizes of the gap between the diffuser and the second incident surface and the gap between the diffuser and the laser light sources are 0.2 mm-0.3 mm.

Position holes are provided on the light guide plate close to edges of the first incident surface and the second incident surface.

Colors of the LED light sources and the laser light sources are complementary colors.

The present invention further provides a display device, comprising a display panel and the aforesaid backlight module, and the display panel is installed on the backlight module.

As utilizing the LED light source and the laser light source at the same time, the backlight module of the present invention employs different incident surfaces of one light guide plate of which forms and lengths are different, and utilizes the diffuser to diffuse the light of the laser light sources. The issues of small lighting angle and low light usage ratio of the laser light source are solved and only one light guide plate is involved to decrease the overall thickness of the backlight module.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
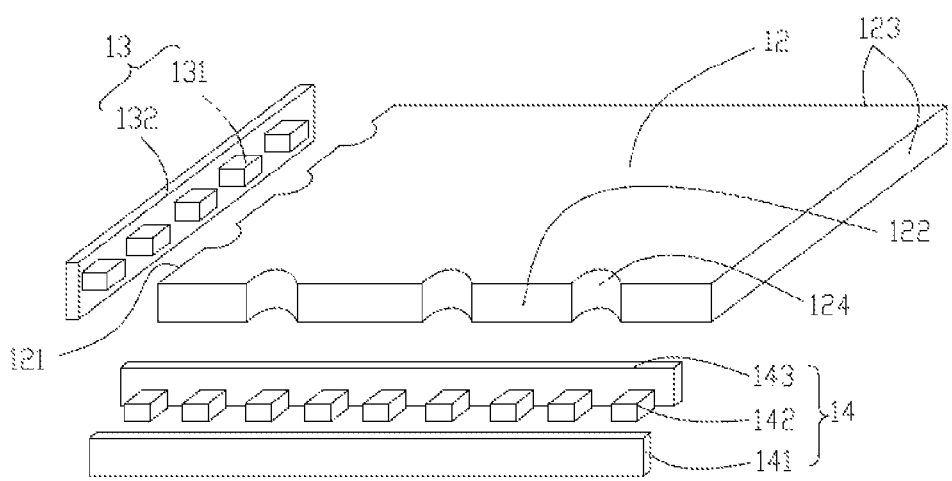
FIG. 1 is a structural diagram of a backlight module according to the present invention.
Figure 2:
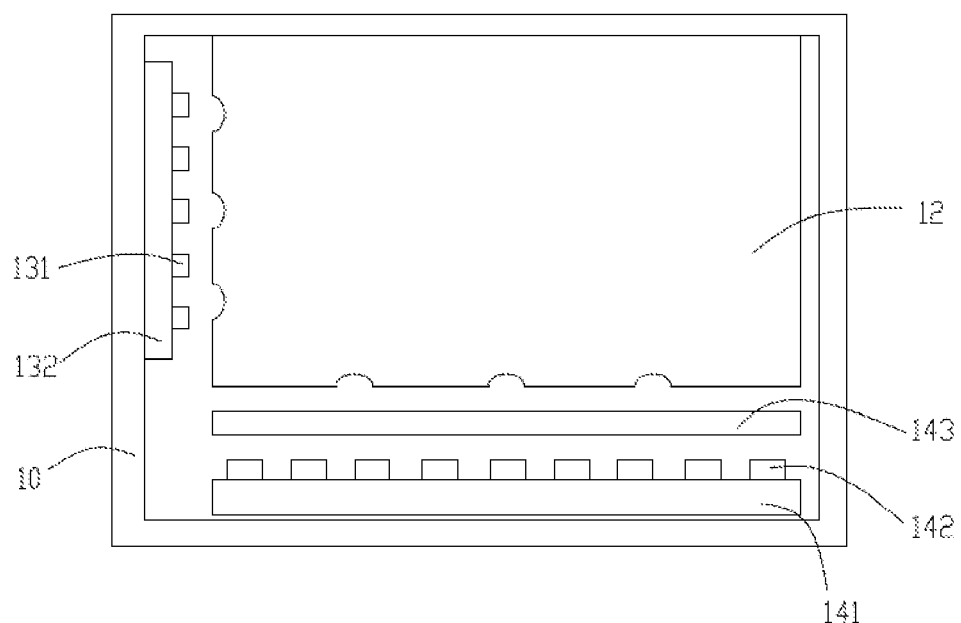
FIG. 2 is a top view diagram of the backlight module shown in FIG. 1.

Please refer to FIG. 1 and FIG. 2. The preferred embodiment of the present invention provides a backlight module, and the backlight module comprises a glue frame 10, a light guide plate 12, a first light source assembly 13 and a second light source assembly 14, and the light guide plate 12, the first light source assembly 13 and the second light source assembly 14 are accommodated in the glue frame 10, and the first light source assembly 13 comprises a light source 131, and the second light source assembly 14 comprises a substrate 141, a plurality of laser light sources 142 and a diffuser 143, and the plurality of laser light sources 142 are aligned on the substrate 141, and the light guide plate 12 comprises a first incident surface 121 and a second incident surface 122 adjacent to the first incident surface 121, and the light source 131 of the first light source assembly 13 and the first incident surface 121 are oppositely positioned, and the plurality of laser light sources 142 and the second incident surface 122 are oppositely positioned, and the diffuser 143 is positioned between the plurality of laser light sources 142 and the second incident surface 122, and gaps are arranged between the diffuser 143 and the second incident surface 142 and between the diffuser 143 and the laser light sources 122.

Furthermore, both sizes of the gap between the diffuser 143 and the second incident surface 122 and the gap between the diffuser 143 and the laser light sources 142 are 0.2 mm-0.3 mm. In this embodiment, the gap between the diffuser 143 and the second incident surface 122 is 0.3 mm. The gap between the diffuser 143 and the laser light sources 142 is 0.2 mm.

Furthermore, the first light source assembly 13 comprises a first substrate 132, and the light source 131 of the first light source assembly 13 is a plurality of LED light sources aligned on the first substrate 132. Colors of the LED light sources 131 and the laser light sources 142 are complementary colors. In this embodiment, a white light can be formed.

In this embodiment, the backlight module further comprises a back plate (not shown) and an optical thin film (not shown). The glue frame 10, the light guide plate 12, the first light source assembly 13 and the second light source assembly 14 are installed inside the back plate, and the glue frame 10 surrounds the light guide plate 12, the first light source assembly 13 and the second light source assembly 14. The optical thin film covers on the light guide plate 12. Position holes 124 are provided on the light guide plate 12 close to edges of the first incident surface 121 and the second incident surface 122. The position holes 124 are employed for positioning the light guide plate 12 on the back plate, and as the light guide plate expands and contracts, the positioning of the position holes and the back plate prevents the displacement of the light guide plate relative to the light source assemblies to avoid the occurrence of over large gaps.

Furthermore, in this embodiment, the length of the first incident surface 121 of the light guide plate 12 is smaller than the length of the second incident surface 122. In other embodiments, the length of the first incident surface 121 of the light guide plate 12 is larger than the length of the second incident surface 122. The diffuser 143 is positioned between the plurality of laser light sources 142 and the second incident surface 122 and employed to increase the incident angle of the light from the laser light sources 142 entering the second incident surface 122. Accordingly, the light of the laser light sources 142 is diffused and uniformly enters the light guide plate 12.

Furthermore, the light guide plate 12 is a rectangular plate body, further comprising two adjacent non incident surfaces 123, and heat expansion directions of the light guide plate are directions of the non incident surfaces 123. In this embodiment, the four surfaces, the first incident surface 121, the second incident surface 122 and the two non incident surfaces 123 are four interconnected lateral sides. After the light source 131 and the laser light sources 142 irradiate the light guide plate, the light guide plate 12 is heated and deforms. In this embodiment, the heat volume change direction of the light guide plate 12 is away from the light source 131 and the laser light sources 142. Accordingly, the distance between the light source 131 and the first incident surface 121 can be ensured, and meanwhile, the distance between the laser light sources 142 and the second incident surface 122 can be ensured, too. Consequently, the coupling distance of the light sources can be ensured to promote the light efficiency.

Furthermore, the light source of the first light source assembly and the plurality of laser light sources are not in the same horizontal plane. The light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate. The mesh dots corresponding to the light source 131 and the mesh dots of the laser light sources 142 do not influence to each other and generate complementary effect. The mesh dots corresponding to the laser light sources are aligned with a gradually increased density from an end close to the laser light sources as a start toward an end away from the laser light sources. In this embodiment, the mesh dots of the LED light source 131 are positioned on the upper surface of the light guide plate 12 (the surface facing the optical thin film); the mesh dots of the laser light sources are positioned on the lower surface.

As utilizing the LED light source and the laser light source at the same time, the backlight module of the present invention employs different incident surfaces of one light guide plate of which forms and lengths are different, and utilizes the diffuser to diffuse the light of the laser light sources. The issues of small lighting angle and low light usage ratio of the laser light source are solved and only one light guide plate is involved to decrease the overall thickness of the backlight module.

The present invention further provides a display device, comprising a display and the backlight module. The display panel is installed on the backlight module. The display device has thinner backlight module. The overall appearance can be lightened.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising a glue frame, a light guide plate, a first light source assembly and a second light source assembly, wherein the light guide plate, the first light source assembly and the second light source assembly are accommodated in the glue frame, and the first light source assembly comprises a light source, and the second light source assembly comprises a substrate, a plurality of laser light sources and a diffuser, and the plurality of laser light sources are aligned on the substrate, and the light guide plate comprises a first incident surface and a second incident surface adjacent to the first incident surface, and the light source of the first light source assembly and the first incident surface are oppositely positioned, and the plurality of laser light sources and the second incident surface are oppositely positioned, and the diffuser is positioned between the plurality of laser light sources and the second incident surface, and gaps are arranged between the diffuser and the second incident surface and between the diffuser and the laser light sources;

wherein the light source of the first light source assembly and the plurality of laser light sources are not in the same horizontal plane; and wherein the light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate, and the mesh dots corresponding to the laser light sources are aligned with a gradually increased density from an end close to the laser light sources as a start toward an end away from the laser light sources.

2. The backlight module according to claim 1, wherein the first light source assembly comprises a first substrate, and the light source of the first light source assembly is a plurality of LED light sources aligned on the first substrate.

3. The backlight module according to claim 2, wherein colors of the LED light sources and the laser light sources are complementary colors.

4. The backlight module according to claim 1, wherein the light guide plate is a rectangular plate body, further comprising two adjacent non incident surfaces, and heat expansion directions of the light guide plate are directions of the non incident surfaces.

5. The backlight module according to claim 1, wherein a length size of the first incident surface and a length size of the second incident surface of the light guide plate are unequal.

6. The backlight module according to claim 1, wherein both sizes of the gap between the diffuser and the second incident surface and the gap between the diffuser and the laser light sources are 0.2 mm-0.3 mm.

7. The backlight module according to claim 1, wherein position holes are provided on the light guide plate close to edges of the first incident surface and the second incident surface.

8. A display device, comprising a display panel and a backlight module, wherein the backlight module comprises a glue frame, a light guide plate, a first light source assembly and a second light source assembly, and the light guide plate, the first light source assembly and the second light source assembly are accommodated in the glue frame, and the first light source assembly comprises a light source, and the second light source assembly comprises a substrate, a plurality of laser light sources and a diffuser, and the plurality of laser light sources are aligned on the substrate, and the light guide plate comprises a first incident surface and a second incident surface adjacent to the first incident surface, and the light source of the first light source assembly and the first incident surface are oppositely positioned, and the plurality of laser light sources and the second incident surface are oppositely positioned, and the diffuser is positioned between the plurality of laser light sources and the second incident surface, and gaps are arranged between the diffuser and the second incident surface and between the diffuser and the laser light sources;

wherein the light source of the first light source assembly and the plurality of laser light sources are not in the same horizontal plane; and wherein the light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate, and the mesh dots corresponding to the laser light sources are aligned with a gradually increased density from an end close to the laser light sources as a start toward an end away from the laser light sources.

9. The display device according to claim 8, wherein the first light source assembly comprises a first substrate, and the light source of the first light source assembly is a plurality of LED light sources aligned on the first substrate.

10. The display device according to claim 9, wherein colors of the LED light sources and the laser light sources are complementary colors.

11. The display device according to claim 8, wherein the light guide plate is a rectangular plate body, further comprising two adjacent non incident surfaces, and heat expansion directions of the light guide plate are directions of the non incident surfaces.

12. The display device according to claim 8, wherein a length size of the first incident surface and a length size of the second incident surface of the light guide plate are unequal.

13. The display device according to claim 8, wherein both sizes of the gap between the diffuser and the second incident surface and the gap between the diffuser and the laser light sources are 0.2 mm-0.3 mm.

14. The display device according to claim 8, wherein position holes are provided on the light guide plate close to edges of the first incident surface and the second incident surface.

* * * * *